US00RE43718E

(19) United States
(12) Reissued Patent
Friedman

(10) Patent Number: US RE43,718 E
(45) Date of Reissued Patent: Oct. 9, 2012

(54) CLAMPING DEVICE FOR A CUTTING INSERT

(75) Inventor: Jacob Friedman, Kfar Vradim (IL)

(73) Assignee: Iscar, Ltd., Tefen (IL)

(21) Appl. No.: 13/033,421

(22) Filed: Feb. 23, 2011

Related U.S. Patent Documents

Reissue of:
(64) Patent No.: 5,799,554
Issued: Sep. 1, 1998
Appl. No.: 08/907,084
Filed: Aug. 6, 1997

U.S. Applications:
(63) Continuation of application No. 08/342,277, filed on Nov. 18, 1994, now Pat. No. 5,697,271.

(30) Foreign Application Priority Data

Nov. 19, 1993 (IL) ..... 107675

(51) Int. Cl.
*B23B 27/04* (2006.01)

(52) U.S. Cl. ..... 82/160; 29/525; 29/426.5; 76/80; 407/50; 407/109; 407/110; 407/117

(58) Field of Classification Search ..... 407/48–50, 407/117, 107–109; 29/525, 426.5, 428; 82/160
See application file for complete search history.

(56) References Cited

U.S. PATENT DOCUMENTS 195,699 A 10/1877 Burger
383,103 A * 5/1888 Cook ..... 83/840
402,400 A 4/1889 Cook
1,672,458 A 6/1928 Horner
3,175,426 A 3/1965 Kolesh et al.
5,035,545 A 7/1991 Zinner
5,697,271 A 12/1997 Friedman et al. ..... 82/160
5,795,109 A * 8/1998 Jonsson et al. ..... 407/72
6,065,906 A * 5/2000 Hansson ..... 407/110

(Continued)

FOREIGN PATENT DOCUMENTS

EP 0 152 729 8/1985

(Continued)

OTHER PUBLICATIONS

Office Action in Japanese Application No. 308368/94, dated Oct. 22, 2004.

(Continued)

*Primary Examiner* — Boyer D Ashley
*Assistant Examiner* — Sara Addisu
(74) *Attorney, Agent, or Firm* — Womble Carlyle

(57) ABSTRACT

A metal cutting tool assembly comprising a rigid holder blade, an insert receiving slot formed in a leading end of the holder blade and defined between a resiliently displaceable clamping jaw formed integrally with the holder blade and rigid base jaw forming part of the holder blade, spaced apart displacement and supporting surfaces respectively formed in or on the clamping jaw and the holder, and a slot opening key, a pair of spaced apart projecting prongs of the key with adapted to engage the surfaces. At least one of the prongs is displaceable with respect to the holder blade so as resiliently to displace the clamping jaw outwardly with respect to the base jaw into an opening position for insertion or removal of an insert.

15 Claims, 5 Drawing Sheets

U.S. PATENT DOCUMENTS

| | | | | |
|---|---|---|---|---|
| 6,454,498 | B1 * | 9/2002 | Hansson et al. | 407/110 |
| 2002/0054792 | A1 * | 5/2002 | Hansson et al. | 407/72 |
| 2002/0081165 | A1 * | 6/2002 | Hecht | 407/110 |

FOREIGN PATENT DOCUMENTS

| | | | |
|---|---|---|---|
| EP | 152729 | A * | 8/1985 |
| EP | 0477480 | | 4/1992 |
| GB | 1 379 637 | | 1/1975 |
| JP | 51-106384 | | 8/1976 |
| PL | 58192 | | 9/1969 |
| WO | WO 93/20972 | | 10/1993 |

OTHER PUBLICATIONS

Office Action in Japanese Application No. 308368/94, dated Mar. 23, 2004.

Office Action in Korean Application No. 10-1994-30360, dated Feb. 25, 2002.

* cited by examiner

CLAMPING DEVICE FOR A CUTTING INSERT

Matter enclosed in heavy brackets [ ] appears in the original patent but forms no part of this reissue specification; matter printed in italics indicates the additions made by reissue.

This is a continuation of application Ser. No. 08/342,277, filed Nov. 18, 1994, now U.S. Pat. No. 5,697,271.

FIELD OF THE INVENTION

This invention relates to metal cutting tool assemblies of the kind wherein an exchangeable cutting insert is releasably retained in an insert retaining slot formed in a holder blade. The invention relates particularly to such a cutting tool assembly wherein the insert is retainably clamped within the retaining slot between a resiliently displaceable clamping jaw and a rigid base jaw without the use of additional mechanical clamping means such as clamping screws or the like.

BACKGROUND OF THE INVENTION

One known form of cutting tool assembly of the kind to which the invention relates involves the so-called "wedge clamping" of the insert in the insert retaining slot. Here, the insert, having a single cutting edge, is provided with a wedge-shaped body which forcibly inserted and is retained within a correspondingly wedge-shaped retaining slot, the actual clamping of the insert within the slot being effected by the resilient outward displacement of the clamping jaw as a result of the forced insertion of the insert into the slot. With this type of cutting tool assembly, the resilient displacement of the jaw is effected by the insertion of the insert into the slot, but when it is desired to remove the insert, special means have to be provided for mechanically ejecting the insert from the slot, these means involving the direct exertion of an ejection pressure on the insert. It will be understood that both the insertion and removal of the insert is accompanied by significant friction with consequent wear on the blade jaws which are, in general, of a much softer material than that of the insert.

Alternatively, it is known (GB 1379637) to introduce into and clamp an insert within an insert retaining slot by first of all mechanically displacing outwardly a resiliently clamping jaw, introducing the insert into the slot and then allowing the jaw to spring back on to the insert in a clamping position. When it is desired to remove the insert from the slot, the clamping jaw is again displaced outwardly, allowing for the removal of the insert. The outward displacement of the jaw is effected using a mechanical key which is displaced in frictional contact with the inside of the clamping jaw, thereby leading to frictional wear of the jaw and/or the key.

BRIEF SUMMARY OF THE INVENTION

It is an object of the present invention to provide a new and improved metal cutting tool assembly in which the above-referred-to disadvantages are substantially reduced or overcome.

According to the present invention, there is provided a metal cutting tool assembly comprising a rigid holder blade;

an insert receiving slot formed in a leading end of the holder blade and defined between a resiliently displaceable clamping jaw formed integrally with said holder blade and rigid base jaw forming part of the holder blade;

spaced apart displacement and supporting surfaces respectively formed in or on said clamping jaw and said holder; and a slot opening key, a pair of spaced apart projecting prongs of said key adapted to engage said surfaces, at least one of said prongs being displaceable with respect to said holder blade so as resiliently to displace said clamping jaw outwardly with respect to said base jaw into an opening position for insertion or removal of an insert.

Preferably, there is formed in the holder blade an extension slot communicating with said insert receiving slot and extending rearwardly thereof. There can be formed in the clamping jaw forwardly of said extension slot a clamping jaw aperture, said displacement surface being constituted by a rim of said clamping jaw aperture.

In accordance with one preferred embodiment of the present invention, the supporting surface is formed on an upper surface of said clamping jaw adjacent said extension slot, one of said prongs being adapted to project into said clamping jaw aperture whilst the other of said prongs bears on said supporting surface, whereby a levering displacement of said one prong with respect to the other prong results in the outward displacement of said clamping jaw.

Alternatively, and in accordance with another preferred embodiment of the present invention, the supporting surface is formed in said base jaw, said supporting surface being constituted by a rim of said base jaw aperture and wherein said opening key is provided with means for displacing said prongs apart whereby, with said prongs projecting respectively into said clamping jaw and base jaw apertures, displacement apart of said prongs results in said outward displacement of said clamping jaw.

Thus, with a cutting tool assembly in accordance with the present invention, displacement of the clamping jaw, whether effected by a levering action or by way of a direct, linearly directed displacement, is not accompanied by any direct contact, either with the insert or with the inner surface of the clamping jaw, and in this way damage thereto is avoided or minimized. Furthermore, introduction into and removal of the insert from the slot is not accompanied by any frictional resistance by the opposite jaw surfaces and there is therefore avoided frictional wear of these surfaces leading to an extended life of the holder blade as a whole.

BRIEF DESCRIPTION OF THE DRAWINGS

For a better understanding of the present invention and to show how the same may be put into practice by way of example, reference will now be made to the accompanying drawings, in which.

DETAILED DESCRIPTION OF PREFERRED EMBODIMENTS

Figure 1:
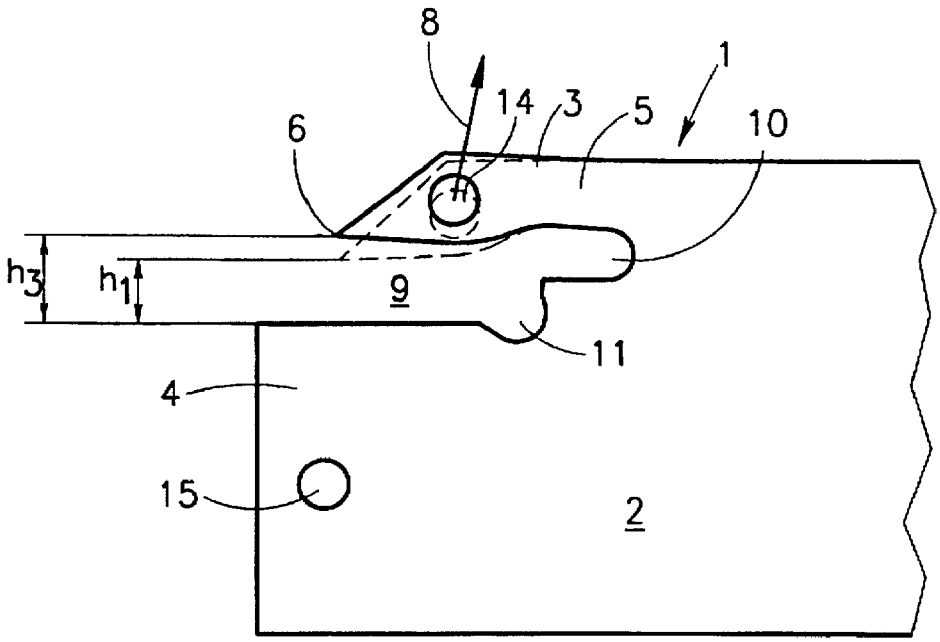
FIG. 1 is a side elevation of a holder blade of a cutting tool assembly in accordance with the present invention.

As seen in FIG. 1 of the drawings, a holder blade 1 for a metal cutting tool assembly in accordance with the present invention comprises a rigid body portion 2 with which are formed integrally a clamping jaw 3 and a base jaw 4. The clamping jaw 3 is coupled to the body portion 2 via a relatively narrow neck portion 5, thereby allowing for a limited degree of flexible resilience of the clamping jaw 3 with respect to the body portion 2 and with respect to the base jaw 4, the latter forming a rigid whole with the body portion 2.

As can be seen in dotted lines in FIG. 1 of the drawings, the clamping jaw 3, in its unstressed position, has its forward tip 6 directed downwardly towards the base jaw 4 and is spaced therefrom by a distance $h_1$.

Figure 2:
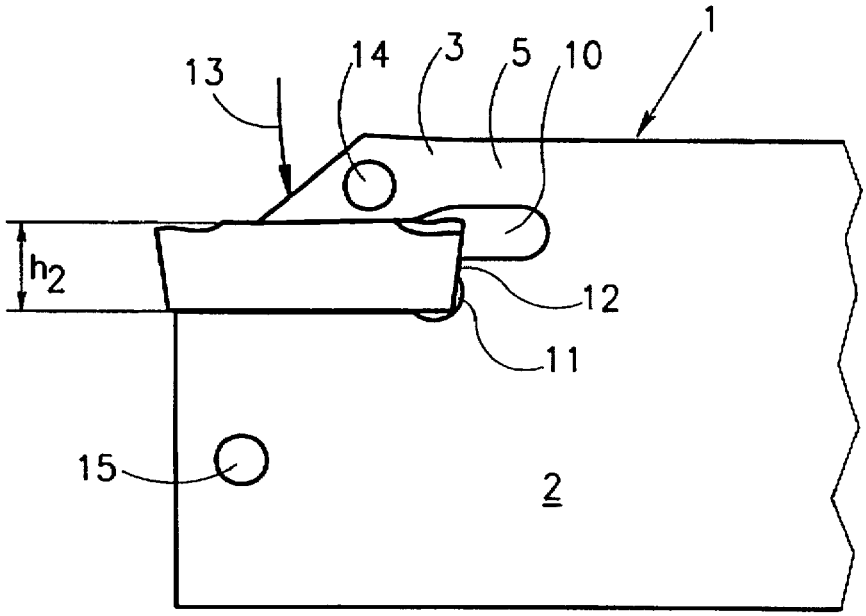
FIG. 2 is a side elevation showing the retention of a cutting insert in the holder blade shown in FIG. 1.

In order to allow for the introduction of an insert 7 (shown in FIG. 2 of the drawings) having a height $h_2$, the clamping jaw 3 must be displaced upwardly in the direction of the arrow 8 (FIG. 1) so mat its forward tip 6 is spaced from the base jaw 4 by a distance $h_3$ where $h_3>h_2$. As seen in FIG. 1 of the drawings, there is formed in a leading end of the holder blade 1, and defined between opposite surfaces of the clamping jaw 3 and base jaw 4, an insert retaining slot 9, a rear end of which communicates with a rearwardly extending extension 10 of the slot 9 and a lower, curved aperture 11. As can be seen in FIG. 2 of the drawings, the location of the extension 10 is such as to be bordered by the narrow neck portion 5 of the clamping jaw. The lower, curved aperture 11 is provided so as to ensure that the lower, innermost edge of the insert is properly located within the aperture 11 without encountering the slot wall. The retained insert 7 is abutted by an abutment 12 of the body portion 2, and the upper, innermost edge of the insert is located within the extension 10. In this way there is prevented possibly damaging abutment of the inner edges of the insert with the body portion.

As can furthermore be seen in FIG. 2 of the drawings, with the insert 7 clampingly retained within the insert retaining slot 9, the clamping jaw 3 bears clampingly downwardly on the upper surface of the insert 7 in the direction of the arrow 13.

There is formed in the clamping jaw 3, forwardly of the neck portion 5, a throughgoing aperture 14, whilst there is formed in the base jaw 4, adjacent a front edge thereof, a throughgoing aperture 15.

Figure 3:
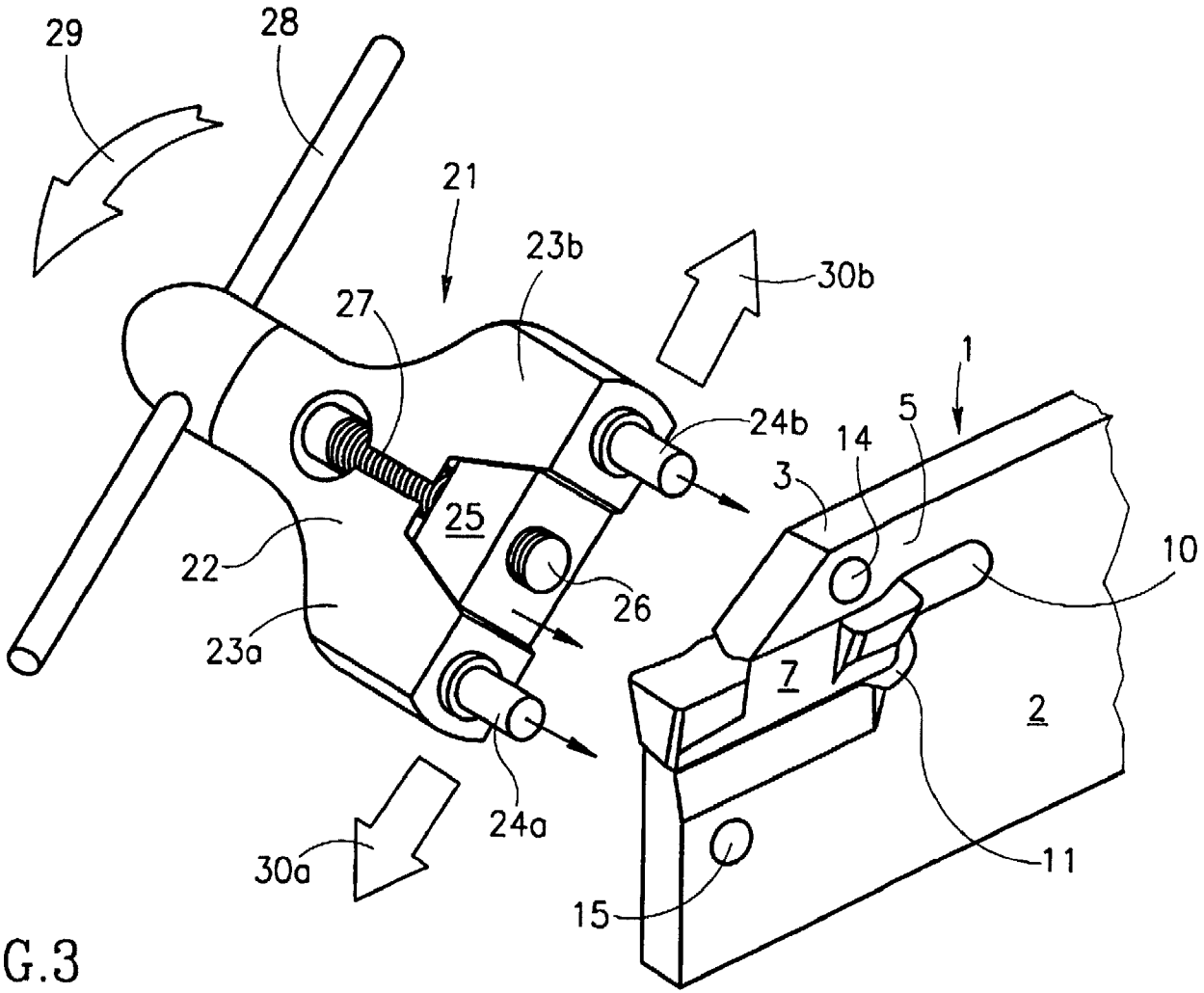
FIG. 3 is a perspective view of the cutting tool assembly shown in FIG. 2, together with an associated retaining slot opening key.

Reference will now be made to FIG. 3 of the drawings, for a detailed description of an insert retaining slot opening key 21 and the manner in which it is used in order to open the insert retaining slot so as to allow for the introduction of the insert. As seen in FIG. 3 of the drawings, the retaining slot opening key 21 comprises a body 22 having a pair of integrally formed legs 23a, 23b from which respectively project a pair of spaced-apart prongs 24a, 24b.

Located between the legs 23a, 23b and bearing against them is a wedge-like spacer 25 having a throughgoing threaded bore 26 through which extends a screw 27, an upper end of which remote from the spacer 25 is coupled to a turning handle 28.

Rotation of the turning handle 28 in the direction of the arrow 29 results in an inwardly-directed displacement of the spacer 25, thereby giving rise to an outwardly-directed displacement of the legs 23a, 23b and a consequent outwardly-directed displacement of the prongs 24a, 24b in the direction of the arrows 30a, 30b.

If now, and prior to the rotation of the handle 28 so as to cause the outward displacement of the prongs 24a, 24b, the latter are inserted in the apertures 15, 14 and rotation of the handle 28 takes place in the direction of the arrow 29, it will be readily seen that there occurs an outwardly-directed displacement of the clamping jaw 3. As a consequence, the clamping jaw 3 effectively pivots about its narrow neck portion 5, thereby increasing the spacing between the clamping jaw 3 and the base jaw 4 and allowing for the introduction or removal of the insert 7. Rotation of the handle 28 in the opposite direction allows for the clamping jaw 3 to return into a clamped position, thereby clampingly retaining the insert in position.

Figure 4:
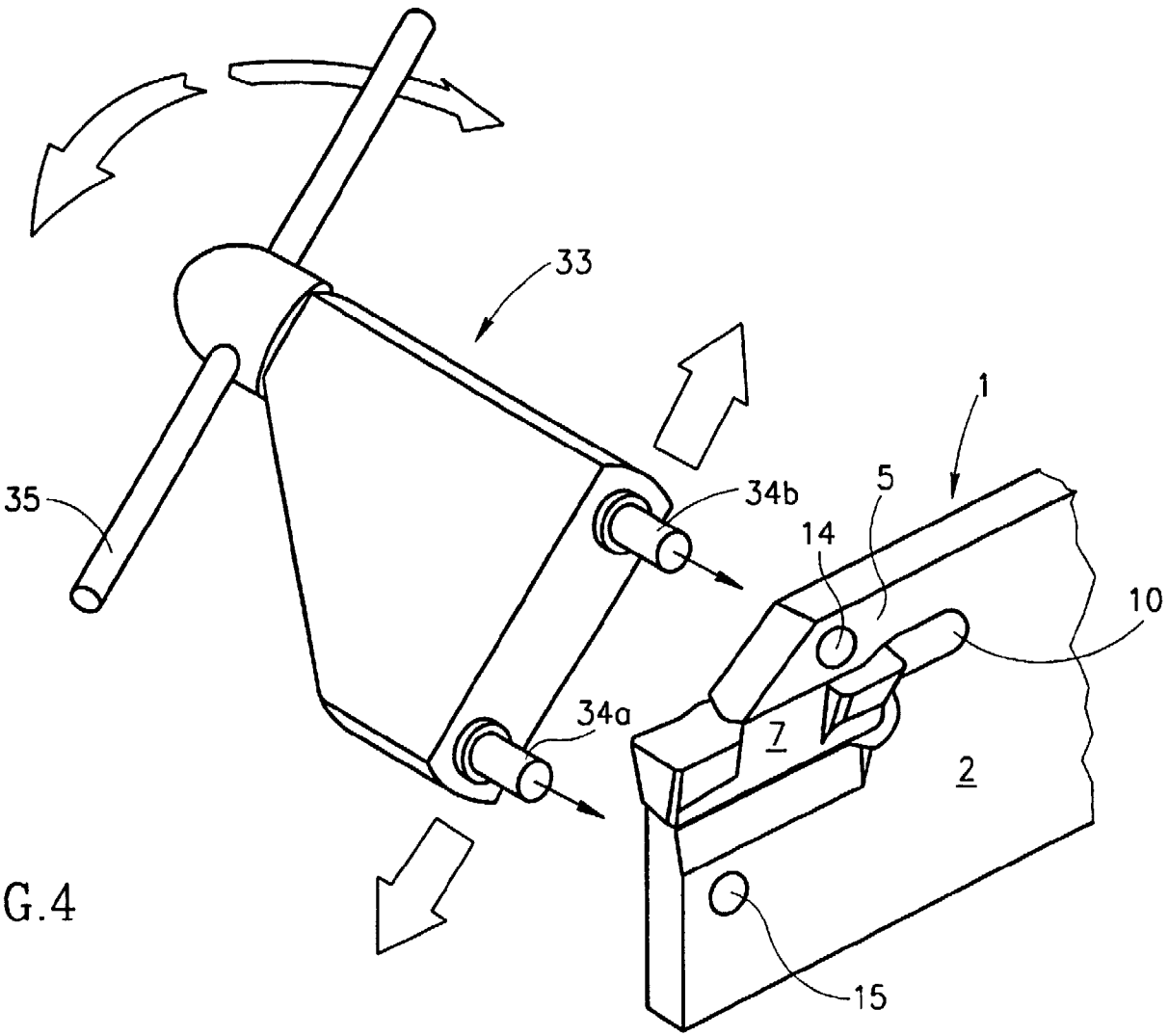
FIG. 4 is a similar view to that shown in FIG. 3, with a modified form of retaining slot opening key.

FIG. 4 shows a modified form of turning key 33 having a fixed projecting prong 34a and an eccentrically rotatable projecting prong 34b which is coupled to a turning handle 35, rotation of which in one sense gives rise to widening the spacing between the prongs 34a, 34b and rotation in the other sense from this widened spacing results in a return to the original spacing.

If now, as before, the prongs 34a, 34b are positioned within the apertures 15, 14, rotation of the handle in one sense gives rise to an outwardly-directed displacement of the clamping jaw, allowing for the insertion or removal of the insert.

It will be appreciated that, in the embodiments shown in FIGS. 3 and 4 of the drawings, a rim of the aperture 14 in the clamping jaw 3 constitutes a clamping jaw displacement surface, whilst a rim of the aperture 15 in the base jaw 4 constitutes a support surface.

Figure 5:
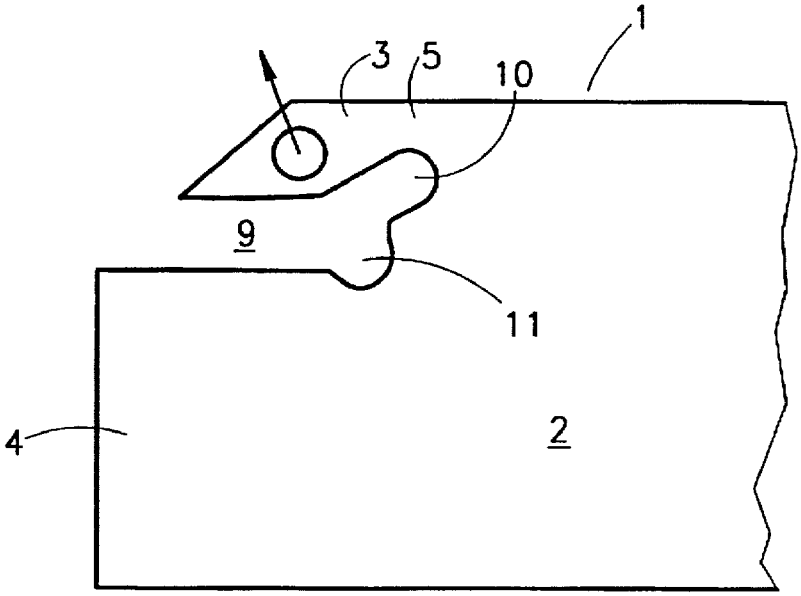
FIG. 5 is a side elevation of a further form of holder blade for a cutting tool in accordance with the present invention.
Figure 6:
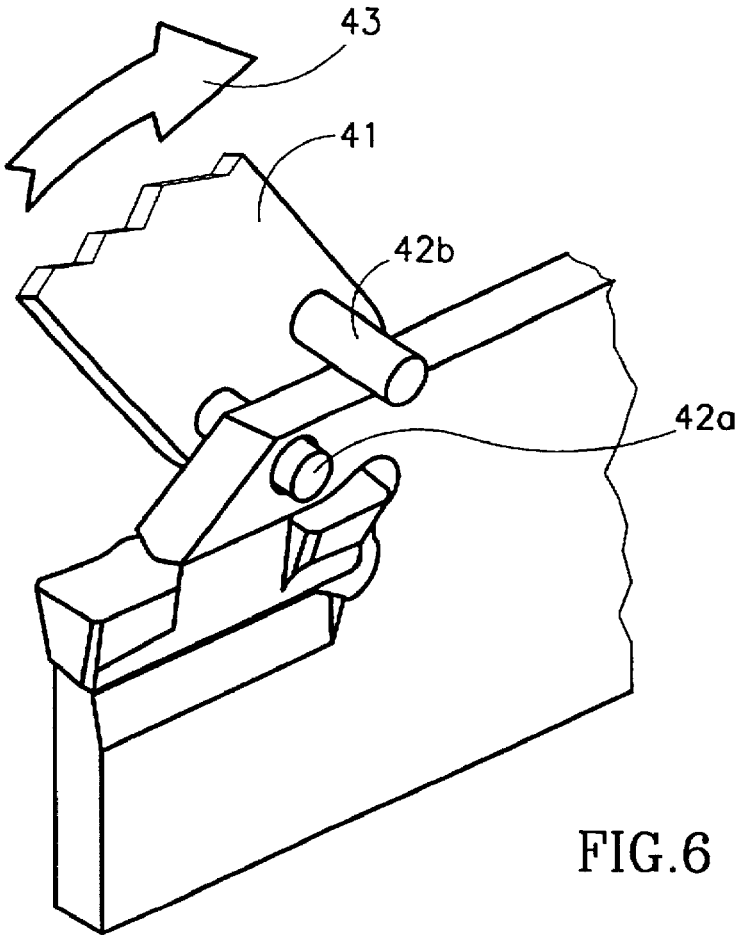
FIG. 6 is a perspective view of the holder blade shown in FIG. 5 and a cutting insert clampingly retained therein, together with an appropriately mounted retaining slot opening key.

Reference will now be made to FIGS. 5 and 6 of the drawings where, as can be seen, the clamping and base jaws define between them, as before, an insert retaining slot which communicates with a rearwardly-directed extension 10 and a lower, curved aperture 11.

As before, there is formed in the clamping jaw 3 a throughgoing aperture 14, but in this embodiment there is not formed any through-going aperture in the base jaw 4. As seen in FIG. 6 of the drawings, a turning key 41 is formed with a pair of spaced-apart, fixed cylindrical prongs 42, 42b with the prong 42a extending through the aperture 14 whilst the prong 42b rests on an upper fulcrum surface of the holder blade 1. If now the key is rotated in the direction of the arrow 43, it can be seen that there will be a levering displacement outwardly of the clamping jaw 3 with respect to the prong 42b. In this embodiment, the rim of the aperture 14 serves as a displacement surface whilst the holder blade 1, upon which rests the prong 42, serves as a supporting fulcrum surface.

Figure 7:
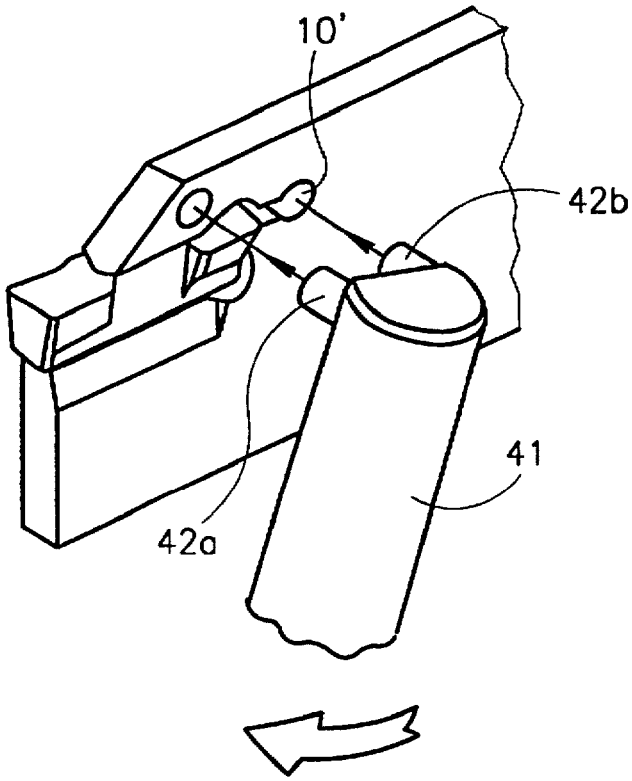
FIG. 7 is a perspective view of a further form of cutting tool assembly in accordance with the present invention, with an associated retaining slot opening key.

In a modified embodiment shown in FIG. 7 of the drawings, a rearwardly-directed extension 10' of the insert retaining slot 9 is shaped to receive the prong 42b of the key 41, with the other prong 43a extends through the aperture 14. Here again, upon rotation of the key 41 in the direction of the arrow, a levering outward displacement of the clamping jaw is effected with respect to the prong 42b. In the case of this embodiment, the rim of the aperture 14 again constitutes a displacing surface whilst the rim of the extension 10' constitutes a supporting fulcrum surface.

Figure 8:
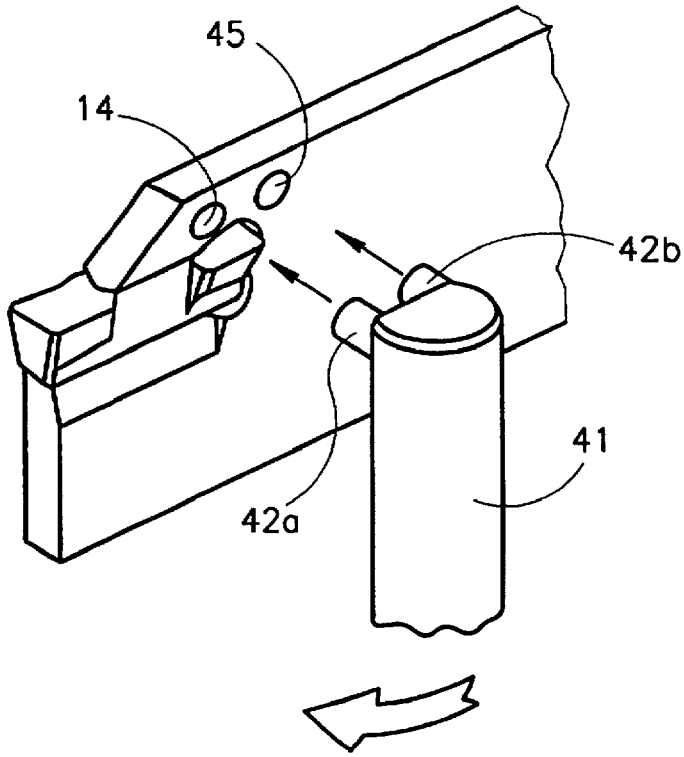
FIG. 8 is a perspective view of a still further form of cutting tool assembly in accordance with the present invention, with an associated retaining slot opening key.

In a still further modification shown in FIG. 8 of the drawings, an additional aperture is formed in an upper portion of the body portion 2 of the holder, adjacent to and spaced from the aperture 14 and displaced inwardly with respect to the slot extension. If now the prongs 42a, 42b are inserted in the apertures 14, 45 and the key is rotated in the direction of the arrow, levering outward displacement of the clamping jaw is effected about the fulcrum constituted by the prong 42b, with the rim of the aperture 14 constituting a displacement surface and the rim of the aperture 45 constituting a supporting fulcrum surface.

Whilst in the embodiments specifically described above clamping retention of a cutting insert having substantially parallel upper and lower surfaces has been described, it will be readily appreciated that the present invention can be extended to the so-called "wedge clamping" of inserts having a wedge-shaped body portion arranged to be retained within a corresponding wedge-shaped slot formed in the holder blade.

It will be furthermore understood that the present invention is not restricted to any particular kind of cutting insert such as, for example, the cutting insert specifically illustrated, but is readily applicable to other forms of cutting inserts.

I claim:

1. A cutting tool assembly comprising:

a) a rigid holder blade, said rigid holder blade comprising:
a body portion,
a base jaw integrally formed with said body portion,
a clamping jaw having a leading portion, said clamping jaw being integrally formed with said body portion and being resiliently and pivotally displaceable relative to said base jaw,
an insert receiving slot having a leading portion and a trailing portion, said slot being defined between said clamping jaw and said base jaw and being adapted to receive an exchangeable cutting insert,
a displacement surface formed in said clamping jaw, said displacement surface being spaced apart from said insert receiving slot and located substantially on said clamping jaw leading portion, and
a supporting surface provided on said body portion, said supporting surface being spaced apart from said displacement surface,
the arrangement being such that a displacing force applied between the supporting and displacement surfaces to move said surfaces relative to each other results in a outwardly directed resilient pivotal displacement of said clamping jaw relative to said base jaw;

b) an insert receiving slot opening key having a pair of spaced apart prongs, a first prong of said key adapted to engage said supporting surface and a second prong of said key adapted to engage said displacement surface for applying said displacing force; and c) means to force apart said first and second prongs, said means including a wedge-like spacer.

2. A cutting tool assembly comprising:

a) a rigid holder blade, said rigid holder blade comprising:
a body portion,
a base jaw integrally formed with said body portion,
a clamping jaw having a leading portion, said clamping jaw being integrally formed with said body portion and being resiliently and pivotally displaceable relative to said base jaw,
an insert receiving slot having a leading portion and a trailing portion, said slot being defined between said clamping jaw and said base jaw and being adapted to receive an exchangeable cutting insert,
a displacement surface formed in said clamping jaw, said displacement surface being spaced apart from said insert receiving slot and located substantially on said clamping jaw leading portion, and
a supporting surface provided on said body portion, said supporting surface being spaced apart from said displacement surface,
the arrangement being such that a displacing force applied between the supporting and displacement surfaces to move said surfaces relative to each other results in a outwardly directed resilient pivotal displacement of said clamping jaw relative to said base jaw;

b) an insert receiving slot opening key having a pair of spaced apart prongs, a first prong of said key adapted to engage said supporting surface and a second prong of said key adapted to engage said displacement surface for applying said displacing force; and c) means to force apart said first and second prongs, said means including a fixed prong and an eccentrically rotatable prong.

3. A substantially rigid holder blade for use in a cutting tool assembly comprising:

a) a body portion;
b) a base jaw integrally formed with said body portion;
c) a clamping jaw integrally formed with said body portion;
d) said jaws being located opposite one another and defining therebetween a cutting insert retaining slot within which a cutting insert can be spring clamped;
e) slot leading and trailing portions;
f) clamping jaw leading and trailing portions respectively and substantially adjacent said slot leading and trailing portions;
g) said clamping jaw being resiliently and pivotally displaceable about its trailing portion;
h) a displacement surface formed substantially on said clamping jaw leading portion and spaced apart from said retaining slot; and
i) a supporting surface formed on said holder blade spaced apart from said displacement surface;
j) the arrangement being such that a displacing force applied between said supporting and displacement surfaces to move said surfaces relative to each other results in outwardly directed resilient pivotal displacement of said clamping jaw with respect to said base jaw for insertion into and withdrawal from said slot of said cutting insert.

4. A holder blade according to claim 3 wherein said clamping jaw trailing portion is coupled to said body portion via a relatively narrow neck portion of a reduced height dimension as compared with a height dimension of the clamping jaw leading portion on which said displacement surface is formed, the dimensions being transverse to a longitudinal direction of said clamping jaw.

5. A holder blade according to claim 4 wherein a first aperture is formed in said clamping jaw leading portion having an aperture rim constituting said displacement surface.

6. A holder blade according to claim 5 wherein a second aperture is formed in said holder blade spaced from said first aperture and having an aperture rim constituting said supporting surface.

7. A holder blade according to claim 6 wherein said second aperture is formed in said base jaw substantially opposite said first aperture.

8. A holder blade according to claim 6 wherein said second aperture is formed substantially adjacent said clamping jaw trailing portion.

9. A holder blade according to claim 5 wherein said supporting surface is formed on an edge surface of said holder blade constituting a continuation of trailing edge surface of said clamping jaw.

10. A holder blade according to claim 5 wherein said supporting surface is formed as a trailing extension of said insert retaining slot.

11. A cutting tool assembly comprising:

a rigid holder blade as claimed in claim 3; and an insert receiving slot opening key having a pair of spaced apart prongs, a first prong of said key adapted to engage said supporting surface and a second prong of said key adapted to engage said displacement surface for applying said displacing force.

12. The assembly according to claim 11 wherein a rotational movement of said key about said first prong displaces said clamping jaw relative to said base jaw.

13. The assembly according to claim 11 further comprising means for displacing said prongs apart.

14. The assembly according to claim 13 wherein said means for displacing said prongs apart includes a wedge-like spacer.

15. The assembly according to claim 13 wherein said means for displacing said prongs apart includes a fixed prong and an eccentrically rotatable prong.

* * * * *